United States Patent [19]

Hetzenegger et al.

[11] Patent Number: 5,472,494
[45] Date of Patent: Dec. 5, 1995

[54] PIGMENT PREPARATION WITH PERYLENE DERIVATIVES AS DISPERSANTS

[75] Inventors: Josef Hetzenegger, Frankenthal; Georg Henning, Ludwigshafen; Peter Erk, Frankenthal, all of Germany

[73] Assignee: BASF Aktiengesellschaft, Ludwigshafen, Germany

[21] Appl. No.: 266,383

[22] Filed: Jun. 27, 1994

[30] Foreign Application Priority Data

Jul. 28, 1993 [DE] Germany .......................... 43 25 247.8

[51] Int. Cl.$^6$ ................................. C08K 5/3437
[52] U.S. Cl. .......................... 106/493; 106/494; 106/498; 106/499
[58] Field of Search ................... 106/493, 494, 106/498, 499

[56] References Cited

U.S. PATENT DOCUMENTS

| | | | |
|---|---|---|---|
| 3,778,287 | 11/1973 | Stansfield et al. | 106/496 |
| 3,996,059 | 12/1976 | Stansfield et al. | 106/499 |
| 4,224,212 | 9/1980 | Topham | 106/20 R |
| 4,398,955 | 8/1983 | Stansfield et al. | 106/23 D |
| 4,634,552 | 1/1987 | Canestri | 252/356 |
| 4,844,742 | 7/1989 | Jaffe | 106/448 |

FOREIGN PATENT DOCUMENTS

| | | |
|---|---|---|
| 411217 | 3/1925 | Germany . |
| 486491 | 11/1929 | Germany . |

OTHER PUBLICATIONS

"Hyperdispersants"; Schofield et al. *JOCCA* (b) 204–210, 1991, ICI Specialties [No month].
Journal of Oil and Colour Chemical Association, 1989, R. Coates, pp. 293–296 and 303, "Advances in Polymeric Wetting Additives for Solvent Based Coatings" [No Month].
Chemical Abstracts, vol. 75, 1971, AN 140549j [No month].
Chemical Abstracts, vol. 85, 1976, AN 85 20928s [No month].
Bulletin of the Chemical Society of Japan, vol. 52, No. 6, 1979, pp. 1723–1726, Yukinori Nagao et al., "Synthesis and Reactions of Perylenecarboxylic Acid Derivatives. VI. Sulfonation of 3,4–Perylenedicarboximide" [No month].

*Primary Examiner*—Mark L. Bell
*Assistant Examiner*—Scott L. Hertzog
*Attorney, Agent, or Firm*—Oblon, Spivak, McClelland, Maier & Neustadt

[57] ABSTRACT

Pigment preparations contain
(a) at least one organic pigment;
(b) at least one perylene derivative of the general formula I

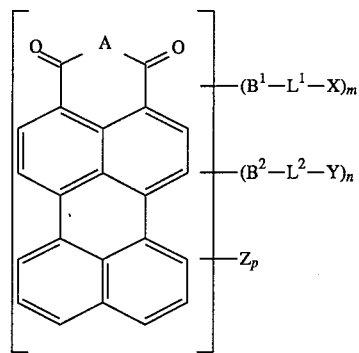

where
A is —O—, —CH$_2$— or —NR$^1$—;
B$^1$ and B$^2$ are independently of each other a chemical bond, —O—, —CH$_2$—, —NR$^2$—, —S—, —CO—, —SO$_2$— or —SO$_2$—NH—;
L$^1$ and L$^2$ are independently of each other a chemical bond, phenylene or C$_1$–C$_8$-alkylene;
X is —SO$_3^\ominus$Ka$^\oplus$;
Y is —CO$_2$Ka$^\oplus$;
Z is chlorine or bromine;
m is from 0 to 4;
n is 0 or 1 and (m+n) is from 1 to 4; and
p is from 0 to 4;
as dispersant;
(c) if desired further customary pigment preparation additives.

9 Claims, No Drawings

PIGMENT PREPARATION WITH PERYLENE DERIVATIVES AS DISPERSANTS

The present invention relates to novel pigment preparations comprising (a) at least one organic pigment;
(b) at least one perylene derivative of the general formula I

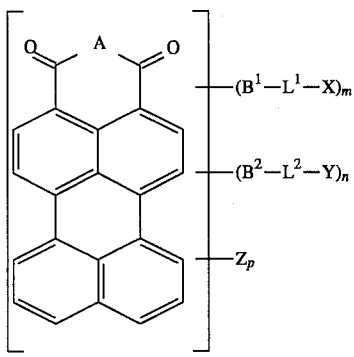

where
A is a bivalent radical —O—, —CH$_2$—or —NR$^1$— wherein R$^1$ is:
hydrogen;
C$_1$–C$_{22}$-alkyl;
C$_5$–C$_8$-cycloalkyl;
aryl which may be monosubstituted or poly-substituted by halogen, C$_1$–C$_4$-alky, C$_1$–C$_4$-alkoxy and/or phenylazo; B$^1$ and B$^2$ are independently of each other a chemical bond or a bivalent radical —O—, —CH$_2$—, —NR$^2$—, —S—, —CO—, —SO$_2$—or —SO$_2$—NH— wherein R$^2$ is hydrogen or C$_1$–C$_6$-alkyl;
L$^1$ and L$^2$ are independently of each other a chemical bond, phenylene or C$_1$–C$_8$-alkylene;
X is —SO$_3^\ominus$ Ka$^\oplus$ wherein Ka$^\oplus$ is:
H$^\oplus$ or the equivalent of a metal cation;
an ammonium cation $^\oplus$N(R$^3$)$_4$ wherein the radicals R$^3$, which can be identical or different, have the following meanings: hydrogen;
C$_1$–C$_{30}$-alkyl or C$_3$–C$_{30}$-alkenyl wherein the carbon chain may in each case be interrupted by one or more groups —O—, —S—or —NR$^2$—and which may each be substituted by C$_1$–C$_6$-alkoxy, amino, hydroxyl and/or carboxyl, and wherein two of the alkyl or alkenyl radicals R$^3$ may also be joined together to form a 5- to 7-membered ring which contains the nitrogen atom with or without further hetero atoms;
C$_5$–C$_8$-cycloalkyl or phenyl which may each be substituted by C$_1$–C$_6$-alky,l C$_1$–C$_6$-alkoxy, amino, halogen, hydroxyl and/or carboxyl, and wherein the carbon skeleton of the cycloalkyl radicals R$^3$ may also be interrupted by one or more groups —O—, —S—or —NR$^2$—;
Y is -CO$_2$Ka$^\oplus$;
Z Ks chlorine or bromine;
m Ks from 0 to 4, the m>1 radicals -B$^1$L$^1$X being identical or different;
n is 0 or 1, the sum (m+n) being from 1 to 4; and
p is from 0 to 4, the p>1 radicals Z being identical or different;
as dispersant;
(c) if desired further additives customary for pigment preparations.

The invention further provides for the use of these pigment preparations for pigmenting macromolecular organic materials.

Organic pigments subjected to various finishing processes to convert them from the as-synthesized into the pigmentary state frequently still have defects when it comes to incorporating them into macromolecular organic materials. The reasons for this are, on the one hand, the poor dispersibility of the pigments and, on the other, the incompatibility of the dispersed pigments with the application medium. In paints and printing inks this leads, for example, to losses in the coloristics, for example to a reduction in color strength and changes in hue and saturation, problems with the glossing, and poorer theological properties. Incorporating the pigments into plastics parts not only impairs the coloristics but also changes the mechanical properties of the plastics parts.

It is known to improve the application properties of the pigments by coating with additives. Not only colorless additives of low or high molecular weight are used but increasingly also pigment derivatives which are partly likewise colored.

However, the treatment of the pigments with these derivatives does not produce a satisfactory result in many cases. Especially paints with a high pigment content still have defects in their flow characteristics and in their coloristic properties, which are due to inadequate stabilization of the pigments in the vehicle.

It is an object of the present invention to provide pigment preparations which have favorable application properties.

We have found that this object is achieved by the pigment preparations defined at the beginning.

We have further found that these pigment preparations can be used for coloring high-polymeric organic materials.

Suitable for use as component (a) of the pigment preparations according to the invention are all organic pigments in finely divided form. Suitable pigment classes include, for example, monoazo, disazo, anthraquinone, anthrapyrimidine, quinacridone, quinophthalone, diketopyrrolopyrrole, dioxazine, flavanthrone, indanthrone, isoindoline, isoindolinone, isoviolanthrone, perinone, perylene, phthalocyanine, pyranyphrone, triphenylmethane and thioindigo pigments and also metal complexes thereof. Specific examples are:

Monoazo pigments:
  C.I. Pigment Brown 25;
  C.I. Pigment Orange 5, 36 and 67;
  C.I. Pigment Red 3, 48:4, 52:2, 251, 112 and 170;
  C.I. Pigment Yellow 1, 3, 73, 74, 65, 97, 151 and 154;
Disazo pigments:
  C.I. Pigment Red 144 and 166;
  C.I. Pigment Yellow 12, 17, 83 and 113;
Anthraquinone pigments:
  C.I. Pigment Yellow 147 and 177;
  C.I. Pigment Violet 31;
Anthrapyrimidine pigments:
  C.I. Pigment Yellow 108;
Quinacridone pigments:
  C.I. Pigment Red 122, 202 and 20;
  C.I. Pigment Violet 19;
Quinophthalone pigments:
  C.I. Pigment Yellow 138;
Dioxazine pigments:
  C.I. Pigment Violet 23 and 27;
Flavanthrone pigments:
  C.I. Pigment Yellow 24;

Indanthrone pigments:
  C.I. Pigment Blue 60 and 64;
Isoindoline pigments:
  C.I. Pigment Orange 69;
  C.I. Pigment Red 260;
  C.I. Pigment Yellow 139;
Isoindolinone pigments:
  C.I. Pigment Orange 61;
  C.I. Pigment Red 257;
  C.I. Pigment Yellow 109, 110 and 173;
Perinone pigments:
  C.I. Pigment Orange 43;
  C.I. Pigment Red 194;
Perylene pigments:
  C.I. Pigment Black 31;
  C.I. Pigment Red 123, 149, 178, 179, 190 and 224;
  C.I. Pigment Violet 29;
Pyranthrone pigments:
  C.I. Pigment Orange 51;
  C.I. Pigment Red 216;
Phthalocyanine pigments:
  C.I. Pigment Blue 15, 15:1, 15:2, 15:3, 15:4, 15:6 and 16;
  C.I. Pigment Green 7 and 36;
Triphenylmethane pigments:
  C.I. Pigment Blue 61 and 62.

Preferred components (a) are perylene pigments, in particular, for example, those of the formula II

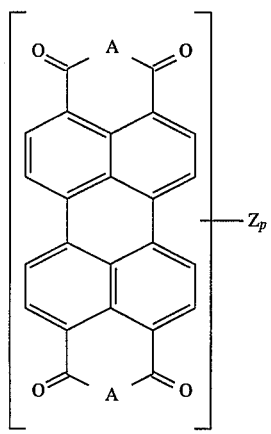

where the variables are each as defined above.

Particular preference is given to perylene pigments which have no substituents in the nucleus (p=0). Of these, those pigments where the radical —A— is —NR$^2$—, in particular with R$^2$ as hydrogen, methyl, 4-ethoxyphenyl, 3,5-dimethylphenyl or 4-phenylazophenyl, are very particularly preferred. Examples are C.I. Pigment Red 179 (R$^2$:CH$_3$) and C.I. Pigment Violet 29 (R$^2$:H).

The perylene derivatives of the formula I used as component (b) in the pigment preparations of the invention are known or preparable by known methods (see for example Bulletin of the Chemical Society of Japan 52 (1979), 1723–1726, DR-P-411 217 and -486 491, and Y. Nagao and T. Misono, Shikizai Kyokai Shi 49(1976), 29, and Yuki Gosei Kagaku Kyokai Shi 29 (1971), 317–319.

Suitable components (b) are perylene derivatives I in which the variable A is —CH$_2$—, preferably —O— and particularly preferably —NR$^1$—.

Suitable radicals R$^1$ are hydrogen, C$_1$–C$_{22}$-alkyl, in particular C$_1$–C$_{18}$-alkyl, C$_5$–C$_8$-cycloalkyl, in particular C$_5$–C$_6$-cycloalkyl, and aryl, such as naphthyl and in particular phenyl, which may each be monosubstituted or polysubstituted by halogen, such as chlorine and bromine, C$_1$–C$_4$-alkyl, in particular methyl, C$_1$–C$_4$-alkoxy, in particular methoxy and ethoxy, and/or phenylazo.

Examples of suitable C$_1$–C$_{22}$-alkyl groups are: methyl, ethyl, propyl, isopropyl, butyl, isobutyl, secbutyl, tert-butyl, pentyl, isopentyl, neopentyl, tertpentyl, hexyl, 2-methylpentyl, heptyl, octyl, 2-ethylhexyl, isooctyl, nonyl, isononyl, decyl, isodecyl, undecyl, dodecyl, tridecyl, 3,5,5,7-tetramethylnonyl, isotridecyl (the above designations isooctyl, isononyl, isodecyl and isotridecyl are trivial names derived from the oxo process alcohols —cf. Ullmanns Encyklopädie der technischen Chemie, 4th edition, Volume 7, pages 215 to 217, and Volume 11, pages 435 and 436), tetradecyl, pentadecyl, hexadecyl, heptadecyl, octadecyl, tallowalkyl (C$_{16}$/C$_{18}$mixture), nonadecyl, eicosyl, behenyl.

Particularly preferred radicals R$^1$ are hydrogen and C$_1$–C$_6$-alkyl.

Suitable groups B$^1$ and B$^2$ are independently of each other a bivalent radical —O—, —CH$_2$—, —NR$^2$—(R$^2$: hydrogen, C$_1$–C$_6$-alkyl), —S—, —CO—, —SO$_2$—or —SO$_2$—NH—. Preferably, however, B$^1$ and B$^2$ are each a chemical bond.

Suitable groups L$^1$ and L$^2$ are phenylene, in particular 1,4-phenylene, also 1,3-phenylene, and C$_1$–C$_8$-alkylene, such as methylene, ethylene, 1,2- and 1,3-propylene, 1,2-, 1,3-, 1,4- and 2,3-butylene, 1,2-, 1,3-, 1,4-, 1,5-, 2,3- and 2,4-pentylene, hexamethylene, heptamethylene and octamethylene. Preferably, however, L$^1$ and L$^2$ are each a chemical bond.

The radical X is a sulfonic acid group —SO$_3^\ominus$Ka$^\oplus$.

Here the cationic group Ka$^\oplus$ is particularly preferably hydrogen.

Further particularly suitable groups Ka$^\oplus$ include the equivalents of metal cations M$^\oplus$/q such as lithium, strontium, barium, manganese, copper, nickel, cobalt, zinc, iron (II), iron (III) and chromium, preferably sodium, potassium, magnesium, calcium and aluminum.

Also suitable are ammonium cations $^\oplus$N(R$^3$)$_4$ wherein the radicals R$^3$, which can be identical or different, have the following meanings:

hydrogen;

C$_1$–C$_{30}$-alkyl groups, preferably C$_1$–C$_{18}$-alkyl groups, it being possible for the carbon chain of these groups to be interrupted by one or more groups —O—, —S— or —NR$^2$—(R$^2$: hydrogen, C$_1$–C$_6$-alkyl) and for these groups to be substituted by C$_1$–C$_6$-alkoxy, amino, hydroxyl and/or carboxyl; in addition to the unsubstituted alkyl groups mentioned for R$^1$ there may be mentioned for example: 2-methoxyethyl, 2-ethoxyethyl, 2-propoxyethyl, 2-isopropoxyethyl, 2-butoxyethyl, 2- and 3-methoxypropyl, 2- and 3-ethoxypropyl, 2- and 3-propoxypropyl, 2- and 3-butoxypropyl, 2- and 4-methoxybutyl, 2- and 4- ethoxybutyl, 2- and 4-propoxybutyl, 2- and 4-butoxybutyl, 3,6-dioxaheptyl, 3,6-dioxyoctyl, 4,8-dioxanonyl, 3,7-dioxaoctyl, 3,7-dioxanonyl, 4,7-dioxaoctyl, 4,7-dioxanonyl, 4,8-dioxadecyl, 3,6,8-trioxadecyl, 3,6,9-trioxaundecyl, 3,6,9,12-tetraoxatridecyl and 3,6,9,12-tetraoxatetradecyl; 2-aminoethyl, 2- and 3-aminopropyl, 2- and 4-aminobutyl, 5-aminopentyl and 6-aminohexyl, 2-hydroxyethyl, 2- and 3-hydroxypropyl, 2- and 4-hydroxybutyl, 5-hydroxypentyl, 6-hydroxyhexyl, 7-hydroxyheptyl and 8-hydroxyoctyl, carboxymethyl, 2-carboxyethyl, 3-carboxypropyl, 4-carboxybutyl and 5-carboxypentyl;

C$_3$–C$_{30}$-alkenyl groups, preferably C$_3$–C$_{18}$-alkenyl groups, whose carbon chain may likewise be interrupted by —O—, —S— or —NR²— and which may carry the substituents mentioned in connection with the alkyl groups; specific examples are: 1- and 2-propenyl, 1-methyl-2-propenyl, 1-, 2- and 3-butenyl, 1,3-butadienyl, 1-, 2-, 3- and 4-pentenyl, 1,3-, 1,4- and 2,4-pentadienyl and oleyl; 4-methoxy-2-butenyl, 4-hydroxy-2-butenyl and 4-carboxy-2-butenyl;

$C_5$–$C_8$-cycloalkyl groups, preferably $C_5$–$C_6$-cycloalkyl groups, which may be substituted by $C_1$–$C_6$-alkyl, $C_1$–$C_6$-alkoxy, amino, halogen, hydroxyl and/or carboxyl and whose carbon skeleton may be interrupted by one or more groups —O—, —S— or NR²—; specific examples are: cyclopentyl, cyclohexyl, cycloheptyl and cyclooctyl; 3-methylcyclopentyl, 4-methyl-, 4- ethylcyclohexyl and 4-ethoxycyclohexyl; 4- chlorocyclohexyl;

a phenyl group which may be substituted by $C_1$–$C_6$-alkyl, $C_1$–$C_6$-alkoxy, amino, halogen, hydroxyl and/or carboxyl; specific examples are: phenyl; 2-, 3- and 4-tolyl; xylyl; 4-methoxyphenyl, 4-ethoxyphenyl, 4-butoxyphenyl; 4-chlorophenyl.

Of the radicals $R^3$ mentioned, hydrogen, $C_1$–$C_{22}$-alkyl, in particular $C_1$–$C_{18}$-alkyl, $C_2$–$C_{12}$-hydroxyalkyl, in particular $C_2$–$C_3$-hydroxyalkyl, $C_3$–$C_{18}$-alkenyl and $C_5$–$C_6$-cycloalkyl are preferred.

It is also possible for two of the alkyl and/or alkenyl radicals $R^3$ to be joined together to form a 5- to 7-membered ring which contains the nitrogen atom with or without further hereto atoms such as —O—, —S—, =N— or —NH—, such as pyrryl, pyridyl, piperidyl, morpholinyl, pyrazolyl, imidazolyl and thiazolyl.

Examples of preferred ammonium cations are mono- and dimethylammonium, mono- and diethylammonium, mono-n- hexyl-, -n-octyl-, -n-decyl-, -n-dodecyl-, -stearyl- and -oleylammonium, monocyclohexylammonium and also 3-cyclohexylaminopropyl, tallowalkyl and 3- tallowalkylaminopropylammonium cations (tallowalkyl $\doteq$ $C_{16}/C_{18}$ mixture; Duomeen®T, Akzo).

The radical Y is a carboxylic acid group -$CO_2Ka^⊕$.

The perylene derivatives I my contain up to four sulfonic acid radicals -$B^1L^1X$ (m from 0 to 4) and also one or no carboxylic acid radical $B^2L^2Y$ (n from 0 to 1), the sum (m+n) being from 1 to 4, preferably 1. Particularly preferably the perylene derivatives I contain a sulfonic acid radical.

Suitable positions in the perylene skeleton for the acid groups are in particular 9 and 10.

Finally, the penylene derivatives I may also be substituted in the nucleus by up to four identical or different halogen atoms Z (chlorine, bromine). Preferably, however, the perylenes I are not substituted by halogen (p=0).

Very particularly preferred components (b) include for example perylene derivatives of the formula Ia

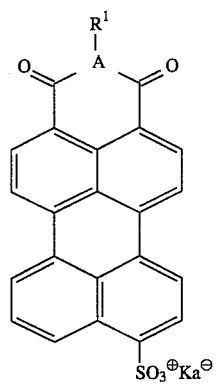

where $R^1$ is hydrogen or $C_1$–$C_6$-alkyl and $Ka^⊕$ is hydrogen or one of the equivalents of metal cations or ammonium cations mentioned as preferred.

The perylene derivatives I act as dispersants and are used in the pigment preparations of the invention in amounts which accord with the application profile desired for the pigment preparation. Generally from 0.1 to 20% by weight, preferably from 0.2 to 5% by weight, based on the pigment (a), is used of dispersant (b).

The pigment preparations of the invention may, according to use, contain further, customary pigment preparation additives (c). They can be used for example to improve pigment wetting or dispersion or as plasticizers or film formers.

Customary additions include for example resins and resin acids, in particular on the basis of rosin and modified rosin, surfactants and also, in particular, polymers having polar anchor groups and block copolymers.

Suitable polymers include in particular for example polyolefins, polyesters, polyethers, polyamides and polyacrylates. Examples of suitable anchor groups are amine and ammonium groups, carboxylic acid and carboxylate groups, sulfonic acid and sulfonate groups, and phosphonic acid and phosphonate groups.

Preferred polymers include those having nitrogen-containing anchor groups, in particular amine and polyalkyleneimine groups, and also block copolymers with polyalkyleneimines such as polyethyleneimines.

Such additives (c) are known to the person skilled in the art. They are largely commercially available (e.g. Solsperse®, ICI; Disperbyk®, Byk) and have been frequently described, for example in the Journal of Coatings Technology 58 (1986), 71, in the Journal of Oil and Colour Chemical Association 1989, 293, and 1991, 204, in DE-A-21 62 484, 22 64 176, 28 07 362 and 28 30 860 and in EP-A-189 385.

Advantageously the pigment preparations of the invention contain from 50 to 99.9% by weight of (a), from 0.1 to 20% by weight of (b) and from 0 to 30% by weight of (c), the presence of from 5 to 20% by weight of the abovementioned, preferred polymers (c) being particularly favorable.

The pigment preparations of the invention can be prepared in various ways. The addition of the dispersant (b) (perylene derivatives I) and, if used, of the additives (c) can take place in the course of pigment synthesis or during one of the customary finishing steps such as grinding or solvent treatment or else not until the incorporation of the pigment into the application medium.

The dispersant (b) may be added in solid or dissolved form to the solid form of the pigment or to the dispersion of the pigment in water or an organic solvent. If the perylene dispersant (I) to be used is a sparingly soluble salt, it can be added directly in the form of a solid. However, it is also possible to use the free sulfonic or carboxylic acid or a corresponding readily soluble salt and to precipitate therefrom the sparingly soluble salt by subsequent addition of a metal salt, of an amine or of an ammonium compound.

The pigment preparations of the invention have good application properties. The organic pigment (a) can be improved in respect of ease of dispersion and resistance to flocculation in the application medium and hence also in respect of gloss and coloristics, and rheology.

The pigment preparations of the invention are highly suitable for coloring macromolecular organic materials. There may be mentioned in particular the preparation of printing inks and paints and the pigmentation of plastics.

Examples of materials to be colored are: natural resins; synthetic resins (addition polymer and condensation polymer resins) such as alkyd resins, acrylic resins, epoxy resins, aminoformaldehyde resins such as melamine and urea resins; cellulose ethers and esters such as ethylcellulose, nitrocellulose, cellulose acetate and butyrate; polyurethanes; polyvinyl chlorides; chlororubber; polyolefins; polyamides; polyesters; epoxy esters; polycarbonates; phenolic resins; rubber; casein; silicone and silicone resins and also mixtures thereof.

The macromolecular organic materials can be present in the coloring step in the form of plastic compounds, melts, solutions, emulsions or dispersions. Paints and printing inks are preferably prepared using solutions or dispersions. Examples of preferred paint systems are alkyd-melamine resin paints, acrylic-melamine resin paints, cellulose acetate/cellulose butyrate paints and two-component paints based on polyisocyanate-crosslinkable acrylic resins.

EXAMPLES

A. Preparation of pigment formulations according to the invention
1. Preparation of pigments (a)
C.I. Pigment Red 179 (Examples 1 to 13):

A mixture of 50 g of perylene-3,4,9,10-tetracarboxylic dianhydride (water-moist) and 400 ml of water was initially cooled with 400 g of ice to 0° C., then admixed with 50 ml of 40% strength by weight aqueous methylamine solution, subsequently stirred at 20° C. for 4 h and at 80° C. for 3 h, and finally cooled down to 60° C.

The finely divided pigment was filtered off, washed with water and dried at 80° C. under reduced pressure.

In the preparation of the pigment formulation of Example 1 the pigment was not dried but was used directly in the form of a water-moist filter cake.

In the preparation of the pigment formulations of Examples 7 to 12 the dried pigment (30 g) was milled for 8 h with 200 g of agate balls (0.5–2 cm in diameter) in a 500 ml agate vessel in a high speed planetary mill model PM 4 from Retsch, Haan. The finely divided pigment obtained had a primary particle size of <0.02 μm. C.I. Pigment Violet 29 (Example 14):

Prepared in a similar manner by reacting 30 g of perylene-3,4,9,10 - tetracarboxylic dianhydride with ammonia. C.I. Pigment Blue 60 (Examples 15 and 16):

30 g of C.I. Pigment Blue 60 in the α-form (e.g. Paliogen® Blue L 6385) were milled for 10 h with 200 g of agate balls (0.5–2 cm in diameter) in a 500 ml agate vessel in a high speed planetary mill model PM 4 from Retsch, Haan.

The milled pigment was introduced into 440 g of 72% strength by weight sulfuric acid. After heating at 80° C. for 4 hours, the mixture was poured onto 500 g of ice.

The pigment was filtered off, washed neutral with water and dried at 80° C. under reduced pressure.

2. Preparation of perylene derivatives (Components (b))
(b1) N-Methylperylene-3,4-dicarboximide-9-sulfonic acid:

First DR-P-411 217 was followed to convert N,N'-dimethylperylene- 3,4,9,10 -tetracarboxylic diimide (C.I. Pigment Red 149 ) into N-methylperylene-3,4,9,10-tetracarboxylic monoimide, and then the latter was converted by the method of Example 4 of DR-P-486 491 into N-methylperylene-3,4-dicarboximide. This product was then converted by the method of Bull. Chem. Soc. Japan 52 (1979), 1723–1726, into the sulfonic acid (b1).
(b2) Perylene-3,4-dicarboximide-9-sulfonic acid:

Prepared by the method of Bull. Chem. Soc. Japan 52 (1979), 1723–1726, from perylene-3,4-dicarboximide.
(b3) Perylene-3,4-dicarboximide-9-sulfonic acid, dimethylditallowalkylammonium salt:

400 g of the sulfonic acid (b2) and 5.65 g of dimethylditallowalkylammonium chloride (Arquad® HC, Akzo) were heated at 90° C. for 2 h at a pH from 7.0 to 7.2. After cooling down to 10° C., the precipitate was filtered off, washed chloride-free and dried at 80° C. under reduced pressure.
(b4) Perylene-3,4 -dicarboximide- 9 - sulfonic acid, aluminum salt:

0.6 g of the sulfonic acid, 10.0 g of $Al_2(SO_4)_3 \cdot 18H_2O$ and 35.0 g of NaCl were milled in the course of the preparation of the pigment formulation together with the pigment (Example 6: 15.0 g of C.I. Pigment Red 179) with 200 g of agate balls (0.5–2 cm in diameter) in a 500 ml agate vessel in a high speed planetary mill model PM 4 from Retsch, Haan, for 8h.

The millbase was stirred for 1 h at 80° C. in 500 ml of water, filtered off, washed chloride-free and dried at 75° C.
(b5) N-Ethylperylene-3,4-dicarboximide-9-sulfonic acid:

First the method of Example 4 of DR-P-486 491 was followed to convert perylene-3,4-dicarboximide into N-ethylperylene- 3,4-dicarboximide and the latter was then converted by the method of Bull. Chem. Soc. Japan 52 (1979), 1723–1726, into the sulfonic acid (b5).
(b6) N-Butylperylene-3,4-dicarboximide-9-sulfonic acid:

Prepared by a similar method to (b5).
(b7) Perylene-3,4 -dicarboximide-9-carboxylic acid:

Prepared by the method of Yuki Gosei Kagaku Kyokai Shi 1971, 317–319 (Chemical Abstracts 75:140549j (1971)).
(b8) N-Methylperylene- 3,4-dicarboximide-9-sulfonic acid, mono (3-tallowalkylaminopropyl) ammonium salt:

A mixture of 18.9 g of the sulfonic acid (b1) and 14.4 g of Duomeen® T (from Akzo) was heated to 60° C. for 10 min and then cooled back down to room temperature.
(b9) Perylene-3,4-dicarboximide-9- (2-sulfoethyl)-sulfonamide ($—B^1L^1X = —SO_2—NH—(CH_2)_2—SO_3H$):

A mixture of 10 g of perylene-3,4-dicarboximide and 100 g of chlorosulfonic acid was stirred at 50° C. for 20 h and then poured onto 300 g of ice. The precipitate was filtered off, washed sulfate-free with cold water, introduced at 0° C. into 100 ml of water and, following the addition of 50 g of 2-aminoethanesulfonic acid, stirred at room temperature for 2 h. Then 1 % strength by weight sodium hydroxide solution was added dropwise until the pH was 8. After heating at 90° C. for six hours, the mixture was adjusted to pH 1 with hydrochloric acid. After further stirring at 90° C. for one hour and cooling down to room temperature, the precipitate was filtered off, washed with 5% strength by weight hydrochloric acid, then briefly refluxed in 1 l of acetone, then filtered off again, washed with acetone and dried at 80° C. under reduced pressure.
3. Preparation of polymers (c)
Polymer (c1):

A mixture of 33.9 g of a 51% strength by weight aqueous solution of a polyethyleneimine (average molecular weight about 1300) and 228 g of 6-caprolactone was heated to 160°–170° C. and held at that temperature for 6 h with distillative removal of water.

The amine number of the polymer obtained was 0.53 mg of KOH/g.

Polymer (c2):

The method of Example 1 of DE-A-28 07 362 was followed to react 1 g of 2-(diethyl)-aminoethanol at 150° C. first with 10 g of ethylene oxide and then with 20 g of propylene oxide.

The average molecular weight of the polymer obtained was 1700 g/mol.

4. Preparation of pigment formulations

Variant A:

A mixture of the as-synthesized, water-moist pigment (a) (Pigment Red 179: water content about 60% by weight), dispersant (b) and 400 ml of water was stirred at 25° C. for 1 h. Following addition of additive (c), the mixture was heated at 80° C. for 1 h. After cooling down to 20° C., the product was filtered off, washed with water and dried at 80° C. under reduced pressure.

Variant B:

Components (a), (b) (and (c)) were milled with 200 g of agate balls (0.5–2 cm in diameter) in a 500 ml agate vessel in a high speed planetary mill model PM 4 from Retsch, Haan, for 8 h.

Variant C:

Components (a) (previously milled similarly to B), (b) (and (c)) were carefully ground together in a grinding bowl.

Variant D:

A mixture of components (a) (previously milled similarly to B), (b) (and (c)), 400 ml of water and 1400 g of zirconia balls (0.2–0.3 mm in diameter; from Magmalox, Cologne) was stirred for1 h in a 1 l stirred vessel at 50° C. with a perforated polypropylene stirrer disk at 2500 rpm. After the zirconia balls had been removed, the millbase was filtered off and dried at 75° C.

Further particulars of compositions of the pigment preparations are given in the table below. B. Assessment of the pigment formulations according to the invention 1. Assessment of the theological properties Each pigment was ground in an acrylic-melamine resin varnish having a nonvolatile content of 54% by weight to prepare paints having a pigment content of 13% by weight, which were evaluated in the as-prepared state using the following scale:

1 set 2 slightly set 3 viscous 4 liquid 5 thin, mobile liquid

The paints prepared for comparison using pigment which had not been coated but otherwise had been given the same treatment were all given the rating 1.

The results of the rheological assessment are given in the table below.

2. Evaluation of the coloristic properties

Each pigment was ground in an alkyd-melamine resin having a nonvolatile content of 41% by weight to prepare paints having a pigment content of 10% by weight.

The gloss was assessed by measuring a full shade drawdown (600 μm) on cardboard according to DIN 67 530.

Uncoated C.I. Pigment Red 179 produced a gloss value of 50 under these conditions.

To assess the coloristics (color strength, hue, saturation) the paints were mixed with a 25% strength by weight $TiO_2$ varnish dispersion in a weight ratio of 1:4 and then likewise drawn down on cardboard (200 μm).

The comparative drawdowns of paints containing pigment which had not been coated but otherwise had been given the same treatment all showed lower color strength, less clean hue and lower color saturation than the drawdowns obtained using the pigment preparations of the invention.

The results of the coloristic studies are likewise shown in the table.

TABLE

| Ex. | Pigment (a) | Component (b) perylene derivative I | Component (c) | g of (a) | g of (b) | g of (c) | Variant | Rheology rating | Coloristics |
|---|---|---|---|---|---|---|---|---|---|
| 1 | P. Red 179 (C.I. 71130) | b1 | c1 | 50 | 1.0 | 10.0 | A | 5 | distinctly stronger, yellower, cleaner than uncoated pigment |
| 1C | P. Red 179 | — | c1 | 50 | — | 10.0 | A | 1 | stronger, yellower, cleaner than uncoated pigment |
| 2 | P. Red 179 | b2 | — | 30 | 0.6 | — | B | 1 | gloss value: 60; stronger, yellower, cleaner |
| 3 | P. Red 179 | b1 | — | 30 | 0.6 | — | B | 1 | gloss value: 60; stronger, yellower, cleaner |
| 4 | P. Red 179 | b2 | c2 | 30 | 0.6 | 3.0 | B | 4 | gloss value: 92; distinctly stronger, yellower, cleaner |
| 4C | P. Red 179 | — | c2 | 30 | — | 3.0 | B | 1 | gloss value: 58; somewhat weaker than pigment |
| 5 | P. Red 179 | b3 | — | 30 | 3.2 | — | B | 1 | gloss value: 70; distinctly stronger, yellower, cleaner;*) |
| 6 | P. Red 179 | b4 | — | 15 | 0.6 | — | B | 1 | stronger, yellower, cleaner |
| 7 | P. Red 179 | b2 | c1 | 40 | 1.0 | 8.0 | D | 5 | gloss value: 100; stronger, yellower, cleaner |
| 8 | P. Red 179 | b1 | c1 | 10 | 0.2 | 2.0 | C | 5 | |
| 9 | P. Red 179 | b5 | c1 | 10 | 0.2 | 2.0 | C | 5 | |
| 10 | P. Red 179 | b6 | c1 | 10 | 0.2 | 2.0 | C | 5 | |
| 8/9/ 10C | P. Red 179 | — | c1 | 10 | — | 2.0 | C | 1 | |

TABLE-continued

| Ex. | Pigment (a) | Component (b) perylene derivative I | Component (c) | g of (a) | g of (b) | g of (c) | Variant | Rheology rating | Coloristics |
|---|---|---|---|---|---|---|---|---|---|
| 11 | P. Red 179 | b7 | c1 | 10 | 0.2 | 2.0 | C | 4 | |
| 12 | P. Red 179 | b8 | c1 | 10 | 0.2 | 2.0 | C | 3 | |
| 13 | P. Red 179 | b9 | c1 | 10 | 0.2 | 2.0 | C | 5 | |
| 14 | P. Violet 29 (C.I. 71129) | b2 | c1 | 30 | 0.2 | 6.0 | B | 5 | |
| 14C | P. Violet 29 | — | c1 | 30 | — | 6.0 | B | 2 | |
| 15 | P. Blue 60 (C.I. 69800) | b2 | c1 | 10 | 0.2 | 2.0 | C | 5 | |
| 15C | P. Blue 60 | — | c1 | 10 | — | 2.0 | C | 1 | |
| 16 | P. Blue 60 | b2 | c2 | 10 | 0.2 | 1.0 | C | 5 | |

*)produces on incorporation into plasticized PVC distinctly more transparent, stronger, yellower and cleaner colorings than uncoated pigment

We claim:

1. Pigment preparations comprising
   (a) at least one organic pigment;
   (b) at least one perylene derivative of the general formula I

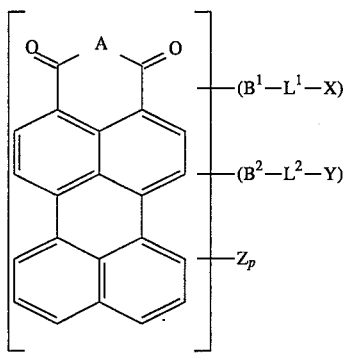

where
A is a bivalent radical —O—, —CH$_2$— or —NR$^1$— wherein R$^1$ is:
hydrogen;
C$_1$–C$_{22}$-alkyl;
C$_5$–C$_8$-cycloalkyl;
aryl which may be monosubstituted or poly-substituted by halogen, C$_1$–C$_4$-alkyl, C$_1$–C$_4$-alkoxy and/or phenylazo;
B$^1$ and B$^2$ are independently of each other a chemical bond or a bivalent radical —O—, —CH$_2$—, —NR$^2$—, —S—, —CO—, —SO$_2$— or —SO$_2$NH— wherein R$^2$ is hydrogen or C$_1$–C$_6$-alkyl;
L$^1$ and L$^2$ are independently of each other a chemical bond, phenylene or C$_1$–C$_8$-alkylene;
X is —SO$_3^\ominus$Ka$^\oplus$ wherein Ka$^\oplus$ is:
H$^\oplus$ or the equivalent of a metal cation; an ammonium cation $^\oplus$N(R$^3$)$_4$ wherein the radicals R$^3$, which can be identical or different, have the following meanings: hydrogen; C$_1$–C$_{30}$-alkyl or C$_3$–C$_{30}$-alkenyl wherein the carbon chain may in each case be interrupted by one or more groups —O—, —S— or —NR$^2$— and which may each be substituted by C$_1$–C$_6$-alkoxy, amino, hydroxyl and/or carboxyl, and wherein two of the alkyl or alkenyl radicals R$^3$ may also be joined together to form a 5- to 7-membered ring which contains the nitrogen atom with or without further hetero atoms;

C$_5$–C$_8$-cycloalkyl or phenyl which may each be substituted by C$_1$–C$_6$-alkyl, C$_1$–C$_6$-alkoxy, amino, halogen, hydroxyl and/or carboxyl, and wherein the carbon skeleton of the cycloalkyl radicals R$^3$ may also be interrupted by one or more groups —O—, —S— or —NR$^2$—;
Y is —CO$_2$Ka$^\oplus$;
Z is chlorine or bromine;
m is from 0 to 4, the m>1 radicals —B$^1$L$^1$X being identical or different;
n is 0 or 1, the sum (m+n) being from 1 to 4; and
p is from 0 to 4, the p>1 radicals Z being identical or different;
as dispersant; and
(c) optionally, one or more additives to improve pigment wetting or dispersion or as a plasticizer or as a film former.

2. Pigment preparations as claimed in claim 1 containing as dispersant a perylene derivative of the formula I in which the variables have the following meanings:
A is a bivalent radical —O— or —NR$^1$— wherein R$^1$ is hydrogen, C$_1$–C$_{18}$-alkyl, C$_5$–C$_6$-cycloalkyl or phenyl, which may be monosubstituted or polysubstituted by halogen, methyl, methoxy, ethoxy and/or phenylazo;
B$^1$ and B$^2$ are each a chemical bond;
L$^1$ and L$^2$ are each a chemical bond;
X is —SO$_3^\ominus$Ka$^\oplus$ wherein Ka$^\oplus$ has the following meanings: H$^\oplus$ or the equivalent of a sodium, potassium, magnesium, calcium or aluminum cation; an ammonium cation $^\oplus$N(R$^3$)$_4$ wherein the radicals R$^3$, which can be identical or different, are each hydrogen, C$_1$–C$_{22}$-alkyl, C$_2$–C$_{12}$-hydroxyalkyl, C$_3$–C$_{18}$-alkenyl or C$_5$–C$_6$-cycloalkyl;
Y is —CO$_2$Ka$^\oplus$ wherein Ka$^\oplus$ is as defined above;
(m+n) is 1; and
p is 0.

3. Pigment preparations as claimed in claim 1 containing as dispersant a perylene derivative of the formula I in which the variables have the following meanings:
A is a bivalent radical —NR$^1$— wherein R$^1$ is hydrogen or C$_1$–C$_6$-alkyl;
B$^1$ and B$^2$ are each a chemical bond;
L$^1$ and L$^2$ are each a chemical bond;
X is —SO$_3^\ominus$Ka$^\oplus$ wherein K$^\oplus$ has the following meanings:
H$^\oplus$ or the equivalent of a sodium, potassium, magnesium, calcium or aluminum cation;

an ammonium cation $^\oplus N(R^3)_4$ wherein the radicals $R^3$, which can be identical or different, are each hydrogen, $C_1$–$C_{18}$-alkyl, $C_2$–$C_3$-hydroxyalkyl, $C_3$–$C_{18}$-alkenyl or $C_5$–$C_6$-cycloalkyl;

m is 1;

n is 0; and p is 0.

4. Pigment preparations as claimed in claim 1 containing additives (c) comprising polymers having polar anchor groups.

5. Pigment preparations as claimed in claim 4 containing polymers comprising polyolefins, polyesters, polyethers, polyamides and/or polyacrylates.

6. Pigment preparations as claimed in claim 4 wherein the polar anchor groups of the polymers are amine, carboxylic acid, sulfonic acid and/or phosphonic acid groups.

7. Pigment preparations as claimed in claim 4 wherein the polar anchor groups of the polymers are amine groups.

8. Pigment preparations according to claim 1 containing a) from 50 to 99.9% by weight of pigment, b) from 0.1 to 20% by weight of dispersant, and c) from 0 to 30% by weight of pigment additives.

9. A method for coloring macromolecular organic materials which comprises adding the pigment preparations of claim 1 to a macromolecular organic material.

* * * * *